United States Patent
Hartmann et al.

(10) Patent No.: US 10,746,606 B2
(45) Date of Patent: Aug. 18, 2020

(54) ARRANGEMENT AND METHOD FOR WAVEFRONT ANALYSIS

(71) Applicants: FRAUNHOFER-GESELLSCHAFT ZUR FÖRDERUNG DER ANGEWANDTEN FORSCHUNG E.V., Munich (DE); WESTSÄCHSISCHE HOCHSCHULE ZWICKAU, Zwickau (DE)

(72) Inventors: Peter Hartmann, Greiz (DE); Tobias Baselt, Zwickau (DE); Alexander Kabardiadi, Zwickau (DE)

(73) Assignees: FRAUNHOFER-GESELLSCHAFT ZUR FOERDERUNG DER ANGEWANDTEN FORSCHUNG E.V., Munich (DE); WESTSÄCHSISCHE HOCHSCHULE ZWICKAU, Zwickau (DE)

( * ) Notice: Subject to any disclaimer, the term of this patent is extended or adjusted under 35 U.S.C. 154(b) by 0 days.

(21) Appl. No.: 16/074,528

(22) PCT Filed: Jan. 26, 2017

(86) PCT No.: PCT/EP2017/051637
§ 371 (c)(1),
(2) Date: Aug. 1, 2018

(87) PCT Pub. No.: WO2017/133960
PCT Pub. Date: Aug. 10, 2017

(65) Prior Publication Data
US 2019/0285480 A1    Sep. 19, 2019

(30) Foreign Application Priority Data

Feb. 1, 2016    (DE) .................. 10 2016 201 485

(51) Int. Cl.
G01J 9/00    (2006.01)
G01J 1/04    (2006.01)
G01J 1/42    (2006.01)

(52) U.S. Cl.
CPC .............. *G01J 9/00* (2013.01); *G01J 1/0455* (2013.01); *G01J 1/4257* (2013.01); *G01J 2009/002* (2013.01)

(58) Field of Classification Search
CPC .......... G01J 9/00; G01J 9/02; G01J 2009/002; G01J 1/0455; G01J 1/4257
See application file for complete search history.

(56) References Cited

U.S. PATENT DOCUMENTS

| 4,947,030 A * | 8/1990 | Takahashi ........... G03F 7/70133 250/201.1 |
| 2003/0142410 A1* | 7/2003 | Miyake ............... G03F 7/70075 359/619 |

(Continued)

FOREIGN PATENT DOCUMENTS

| DE | 10128529 A1 | 12/2002 |
| EP | 0319345 A2 | 12/1988 |
| WO | WO-2008/025958 A2 | 3/2008 |

OTHER PUBLICATIONS

D'Nardo Colucci et al., "A Reflective Shack-Hartmann Wave-Front Sensor for Adaptive Optics", P.A.S.P., vol. 106, Oct. 1, 1994, pp. 1104-1110.

*Primary Examiner* — Jonathan M Hansen
(74) *Attorney, Agent, or Firm* — Jacobson Holman, PLLC

(57) ABSTRACT

The present invention relates to an arrangement and to a method for wavefront analysis comprising a radiation source (8) that emits an electromagnetic wavefront of electromagnetic radiation (1) to be analyzed; a spatially resolving detector unit (4, 4a, 4b, 4c) for detecting the electromagnetic (Continued)

Figure 1:
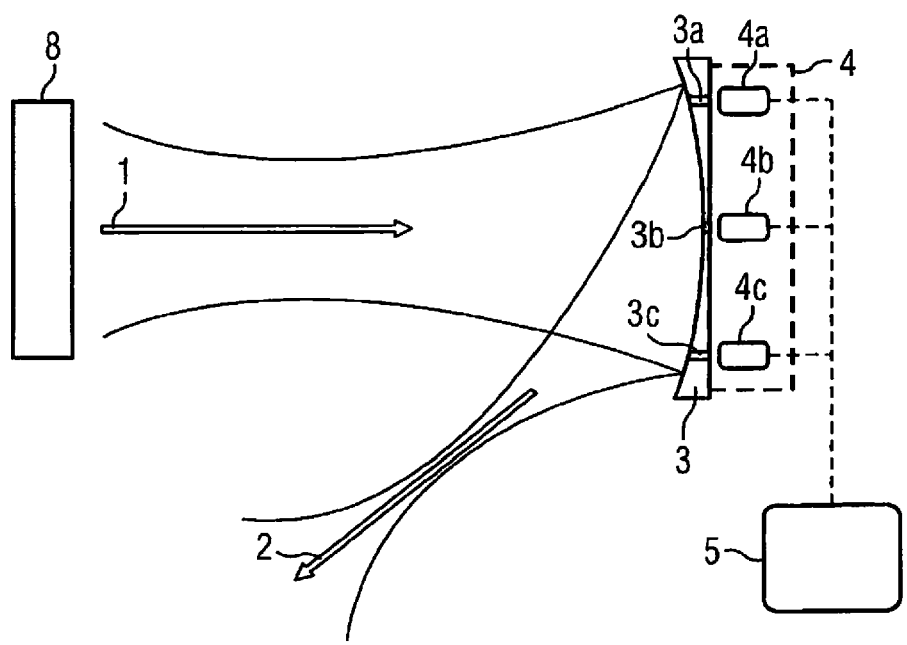

wavefront; and an electronic evaluation unit (5, 7) connected to the detector unit (4, 4a, 4b, 4c). The at least one beam guidance unit (3) for guiding the electromagnetic radiation (1), that is only diffractive and/or reflective, has at least one opening (3a, 3b, 3c) and the detector unit (4, 4a, 4b, 4c) is arranged behind the at least one opening (3a, 3b, 3c) of the beam guidance unit (3) in the direction of propagation of the electromagnetic radiation (1) for detecting a diffraction pattern of the electromagnetic radiation (1) diffracted at the at least one opening (3a, 3b, 3c).

9 Claims, 2 Drawing Sheets

(56) References Cited

U.S. PATENT DOCUMENTS

| | | |
|---|---|---|
| 2006/0191288 A1 | 8/2006 | Radermacher et al. |
| 2008/0151221 A1* | 6/2008 | Sogard .................. G01J 1/04 356/51 |
| 2008/0245505 A1 | 10/2008 | Yamaguchi et al. |
| 2010/0005831 A1 | 1/2010 | Valsman et al. |
| 2011/0298912 A1* | 12/2011 | Jelinek ................ A61B 5/1171 348/78 |

* cited by examiner

ARRANGEMENT AND METHOD FOR WAVEFRONT ANALYSIS

The present invention relates to the arrangement and to a method for wavefront analysis.

Established methods of wavefront analysis are based on a use of periodically arranged aberration centers, for example in Hartmann-Shack wavefront analysis. As disclosed in document DE 101 28 529 A1, a combination between imaging structures and position-sensitive measurement units can be used to determine distributions of intensity, wavefront, and direction of radiation fields. The use of periodic aberration units, however, restricts a flexible use since a minimum number of pieces of measurement information is required for a subsequent evaluation of determined measurement data. A beam to be measured accordingly has to be expanded for the measurement or has to already have a corresponding diameter. The lateral resolution thus remains constant and is not scalable.

The measurement process and measurement system described in DE 101 28 529 A1 moreover uses refractive optical elements, which restricts a spectral applicability.

Further systems for wavefront analysis known from the prior art also have to find a compromise between resolution and dynamics, which as a rule takes place by additional structures and thus higher costs.

It is therefore the underlying object of the invention to propose an arrangement and a method by means of which parameters of a wavefront of an electromagnetic radiation field can even be analyzed at high power densities of the electromagnetic radiation field.

This object is achieved in accordance with the invention by an arrangement in accordance with the independent claims set forth herein. Advantageous embodiments and further developments are described in the dependent claims.

An arrangement for wavefront analysis has a radiation source that emits an electromagnetic wavefront of electromagnetic radiation to be analyzed. In addition, a detector unit that measures with spatial resolutions is provided to detect the electromagnetic wavefront and an electronic evaluation connected to the detector unit is provided. At least one beam guidance unit, that is configured as only diffractive and/or as only reflective and that has at least one opening, serves to guide the electromagnetic radiation. The detector unit is arranged behind the at least one opening of the beam guidance unit in the direction of propagation of the electromagnetic radiation for detecting a diffraction pattern of the electromagnetic radiation diffracted at the at least one opening.

The described optoelectronic arrangement thus serves a reliable and fast determination of parameters of a wavefront directly in an imaging beam path of a desired wave field of the electromagnetic radiation without having to make use of refractive or transmitting elements, but rather of one or more beam guidance units acting only diffractively or reflectively. Absorption losses in the material of the imaging elements are thus avoided. The intensity of the radiation field to be analyzed, i.e. the intensity of the electromagnetic radiation to be analyzed, is also not limited by the destruction threshold of the material of imaging elements. Since the proposed system makes use of imaging properties of pinholes by the opening of the beam guidance unit, it is spectrally independent and can be used in a wide spectral range. In addition, a large local angular resolution can even be ensured with very highly dynamic wavefronts.

Provision can be made that at least the beam guidance unit, the detector unit, or the evaluation unit are movable in at least two degrees of freedom relative to the radiation source. However, at least the beam guidance unit and the detector unit should generally be movable together. A flexibility of the described arrangement is increased by the movable design of the components.

Alternatively, the beam guidance unit, the detector unit, and the evaluation unit can, however, also be arranged in a fixed position with respect to the radiation source to enable a compact design.

The beam guidance unit can be formed as a spherical mirror, an aspherical mirror, or a free-formed mirror, i.e. a mirror of any desired form, to achieve the desired reflection properties.

The at least one beam guidance unit should have a surface on which the electromagnetic radiation is incident and which has a layer reflecting the electromagnetic radiation, a layer system reflecting the electromagnetic radiation, or a reflection hologram. The reflection properties can here be given a flexible design. The surface can here be designed such that optical losses that occur, during the reflection are as small as possible.

The at least one opening can be designed in the form of a circle, of a cross, of a line, of a rectangle, of a triangle, of a trapezoid, or a diamond, or in any further desired form. If a plurality of openings are used, all of the openings can have the same shape or can at least partly differ in shape. Equally, all the openings can have the same size or at least one of the openings can have a size differing from the further openings, i.e. can at least partly differ in shape. The openings are typically arranged periodically, i.e. they in particular have a spacing of respectively the same size. Provision can, however, also be made that the spacing between the openings for at least one pair of the openings differs from the spacing with further pairs of the openings.

The detector unit and/or the beam guidance unit can have at least one cooling passage for cooling and for leading off heat generated by the incident electromagnetic radiation. An active cooling typically takes place here via a rear side, that is, a side remote from the incident electromagnetic radiation.

The detector unit can be configured as a position-sensitive detector (position sensitive device, PSD), as a four quadrant diode, as a CCD sensor (charge coupled device), or as a video system to be able to reliably carry out a spatially resolved measurement of the diffraction structure.

In a method for wavefront analysis, electromagnetic radiation having an electromagnetic wavefront to be analyzed is emitted by means of a radiation source and the electromagnetic radiation is guided by at least one beam guidance unit that is only diffractive and/or only reflective and that has at least one opening and is thus reflected and diffracted. The electromagnetic wavefront is detected by means of a spatially resolving detector unit that is arranged behind the opening of the beam guidance unit in the direction of propagation of the electromagnetic radiation and is evaluated by an electronic evaluation unit connected to the detector unit.

Both a wavefront analysis can be efficiently carried out and the electromagnetic radiation to be analyzed can be used for further purposes due to the simultaneous reflection of one portion of the electromagnetic radiation and the diffraction of a further portion.

At least one wavelength from the wavelength range between far ultraviolet light and infrared light, that is, at least a wavelength from the range between 200 nm and 1 mm, is preferably used as the electromagnetic radiation.

The described method is typically carried out using the described apparatus; the described apparatus is therefore adapted to carry out the described method.

Embodiments of the invention are shown in the drawings and will be explained in the following with reference to FIGS. 1 to 4.

Figure 2:
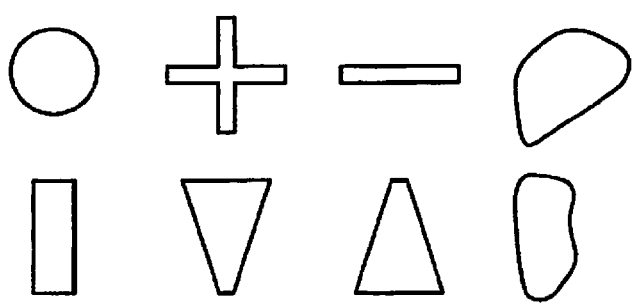
Figure 3:
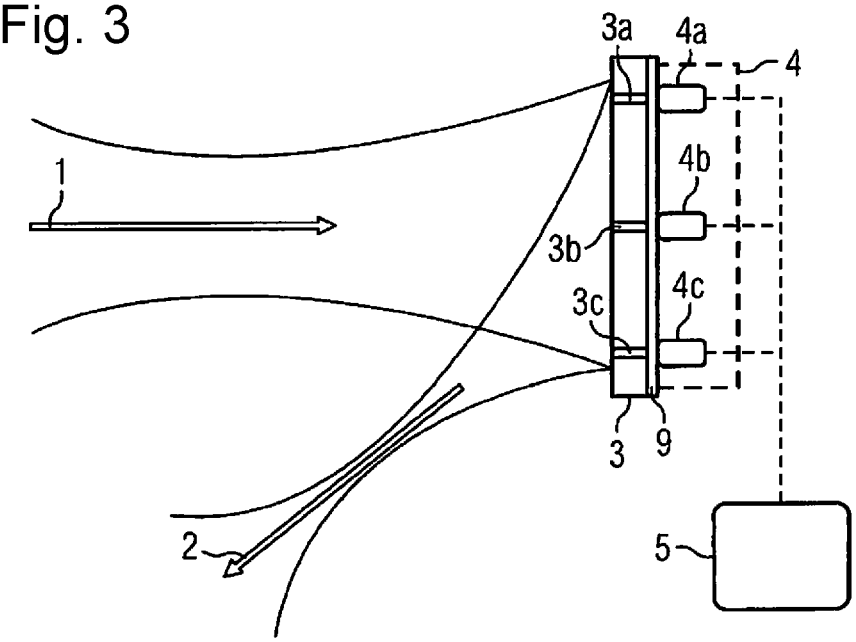
Figure 4:
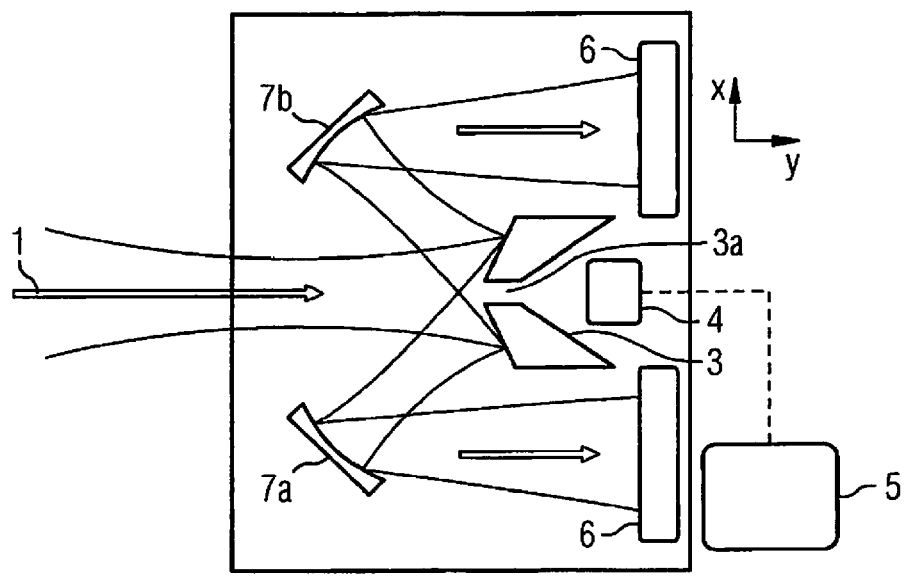

There are shown:

FIG. 1 a schematic representation of an arrangement for wavefront analysis with a spherically shaped beam guidance unit;

FIG. 2 a plurality of possible forms of an opening in the beam guidance unit;

FIG. 3 a representation corresponding to FIG. 1 with a diffractive structure as a beam guidance unit; and FIG. 4 a representation corresponding to FIG. 1 with an arrangement in which a plurality of part beams are formed.

An arrangement for wavefront analysis is shown in a schematic side view in FIG. 1. A radiation source 8 emits electromagnetic radiation 1 in the visible wavelength range between 400 nm and 780 nm. In further embodiments, the radiation source 8 can also, alternatively or additionally, emit electromagnetic radiation in the ultraviolet wavelength range or in the infrared wavelength range. The electromagnetic radiation 1 is incident as measurement light in a desired beam path on a beam guidance unit 3 designed as reflective in the embodiment shown and having an imaging effect. The beam guidance unit 3 is a spherical mirror here, but can also be an aspherical mirror or a mirror of any other desired form in further embodiments. A reflected portion 2 of the electromagnetic radiation 1 is led away for further use as a beam. A front side of the beam guidance unit 3 facing the radiation source 8 is designed such that as few optical losses as possible occur on reflection. This can take place by a correspondingly selected coating with one or more layers, that is with a layer system.

The beam guidance unit 3 has a plurality of periodically arranged holes 3a, 3b, 3c, each of the same shape and size, at which a portion of the electromagnetic radiation 1 arrives and is diffracted at the openings 3a, 3b, 3c. In further embodiments, at least one of the openings 3a, 3b, 3c, can have a size or shape differing from the other openings 3a, 3b, 3c and/or the arrangement can be aperiodic. The shape of the openings 3a, 3b, 3c is selected here such that the measurement light diffracted at the openings 3a, 3b, 3c can be analyzed with maximum information content. The size of the openings 3a, 3b, 3c is selected as so small relative to the cross-sectional surface of the incident beam of the electromagnetic radiation 1 that only very small portions of this desired wave field, i.e. of the electromagnetic radiation 1, are decoupled so that the incident electromagnetic radiation 1 is reflected largely uninfluenced by the openings 3a, 3b, 3c. Detectors 4a, 4b, 4c that together form a detector unit 4 and that are each configured as optical position sensors in the form of a PSD sensor and that are each associated with one of the openings 3a, 3b, 3c are arranged behind the beam guidance unit 3 in the direction of propagation of the electromagnetic radiation 1. In further embodiments, however, at least one of the detectors 4a, 4b, 4c can also have a type differing from the others, that is, can be a CCD detector, for example. The radiation field to be examined, i.e. the electromagnetic radiation 1 to be analyzed is redirected or deflected by means of reflection at the beam guidance unit 3.

The detector unit 4 is an analog or digital component and is electrically connected to an electronic evaluation unit 5 that receives and evaluates signals of the detector unit 4 and presents the signals of the detector unit 4 and/or the information acquired from the evaluation or analysis on an output unit, for example on a monitor or display. Parameters of an optical wavefront can thus be acquired by the shown optoelectronic arrangement directly in an imaging beam path of a desired wave field and without a use of refractive and transmitting elements (such as lenses, prisms, or beam splitter plates). A large local angular resolution can be achieved even with very highly dynamic wavefronts using the system shown.

The arrangement shown in FIG. 1 can be arranged at a fixed position with respect to the radiation source 8; however, it is also possible to mechanically or optically move the beam guidance unit 3, detector unit 4 and the electronic evaluation unit 5 or at least one of said components in at least two degrees of freedom with respect to the radiation source 8. This can take place, for example, by a design of said components arranged on a translation table having two axes of movement perpendicular to one another. A single-part design of the arrangement having components fixedly connected to one another can also be provided. Alternatively, at least one of the components of the arrangement can naturally also be designed as releasable from the remaining arrangement.

Unlike already known Hartmann-Shack systems, it is not the location of the maximum of the measurement light diffracted at the openings 3a, 3b, 3c using the arrangement shown, but rather the complete diffraction pattern of the measurement light portions that is analyzed and is registered without further optical imaging at the two-dimensional detector unit 4 that measures with spatial resolution and is analyzed by the evaluation unit 5. The wavefront or parameters of the wavefront from one or more measurements is/are modulated by the evaluation unit 5, for example using Zernike polynomials, and a complete form of the wavefront to be measured or analyzed is thus reconstructed. A direct optical imaging of a wave field to be examined in a single beam path therefore takes place. The optical arrangement shown is thus an element of in imaging beam path of an optical device.

A plurality of possible shapes of the openings 3a, 3b, 3c are shown in FIG. 2. The openings 3a, 3b, 3c can be round, ellipsoid, of cross-shape, linear, trapezoidal, diamond-shaped or can be designed in any other desired shape. Repeating features are provided with identical reference numerals in this Figure and also in the following Figures.

FIG. 3 shows in a representation corresponding to FIG. 1 a further embodiment of the arrangement in which, however, for reasons of clarity, a representation of the radiation source 8 has been omitted and now a diffractive reflective structure in the form of a hologram forms the beam guidance element 3 instead of a spherical mirror. In addition, a cooling passage 9 is now arranged at a rear side of the beam guidance element 3 remote from the radiation source 8; it equally contacts the detector unit 4 and is intended to discharge heat arising by incidence on the electromagnetic radiation 1 at the components in direct contact with it, that is at the beam guidance unit 3 and the detector unit 4. The cooling passage 4 can naturally equally also be used in the further embodiments shown.

A further embodiment is shown in FIG. 4, with in this case the electromagnetic radiation 1 transmitted by the radiation source 8 (not shown for reasons of clarity) and incident on the beam guidance unit 3 is split by the beam guidance unit 3 after decoupling of the measurement light incident on the detector unit 4 into two reflected part beams that are each incident on a beam absorber 6 via a mirror system 7a, 7b.

In a further embodiment, the radiation field to be analyzed, i.e. the electromagnetic radiation 1, can also be directly incident on a beam trap that is provided with cooling apparatus to dissipate the energy of the radiation field.

Features of the different embodiments only disclosed in the embodiment examples can be combined with one another and claimed individually.

The invention claimed is:

1. An arrangement for wavefront analysis comprising
a radiation source (8) that emits an electromagnetic wavefront of electromagnetic radiation (1) to be analyzed;
a spatially resolving detector unit (4) for detecting the electromagnetic wavefront;
an electronic evaluation unit (5, 7) connected to the detector unit (4); and
a beam guidance unit (3) for guiding the electromagnetic radiation (1) that is only diffractive or only reflective and that has openings (3a, 3b, 3c), wherein
the spatially resolving detector unit (4) comprises for each of the openings (3a, 3b, 3c) a detector (4a, 4b, 4c) which is configured as a position sensor in the form of a position sensitive device (PSD), a four quadrant diode, a CCD sensor or a video system, the detectors (4a, 4b, 4c) are arranged behind a respective opening (3a, 3b, 3c) of the beam guidance unit (3) in the direction of propagation of the electromagnetic radiation (1) to detect a diffraction pattern of the electromagnetic radiation (1) diffracted at the at least one opening (3a, 3b, 3c), and wherein the arrangement is configured without the use of refractive or transmitting elements.

2. An arrangement in accordance with claim 1, wherein at least the beam guidance unit (3), the spatially revolving detector unit (4), or the evaluation unit (5, 7) is movable in at least two degrees of freedom relative to the radiation source (8).

3. An arrangement in accordance with claim 1, wherein the beam guidance unit (3), the spatially resolving detector unit (4), and the evaluation unit (5, 7) are arranged in a fixed position with respect to the radiation source (8).

4. An arrangement in accordance with claim 1, wherein the beam guidance unit (3) is formed as a spherical mirror, as an aspherical mirror, or as a free formed mirror and has a diffractive optical structure.

5. An arrangement in accordance with claim 1, wherein the at least one beam guidance unit (3) has a surface on which the electromagnetic radiation (1) is incident and which has a layer reflecting the electromagnetic radiation (1), a layer system reflecting the electromagnetic radiation (1), or a reflection hologram.

6. An arrangement in accordance with claim 1, wherein the at least one opening (3a, 3b, 3c) is designed in the form of a circle, of a cross, of a line, of a rectangle, of a triangle, of a trapezoid, or of a diamond.

7. An arrangement in accordance with claim 1, wherein the spatially resolving detector unit (4, 4a, 4b, 4c) or the beam guidance unit (3) have at least one cooling passage (9).

8. A method of wavefront analysis, in which
electromagnetic radiation (1) having an electromagnetic wavefront to be analyzed is emitted by means of a radiation source (8);
the electromagnetic radiation (1) is guided by a beam guidance unit (3), that is only diffractive or only reflective and that has openings (3a, 3b, 3c), and is thus either reflected or diffracted; and
the electromagnetic wavefront is detected by means of detectors (4a, 4b, 4c) that are arranged behind the openings (3a, 3b, 3c) of the beam guidance unit (3) in the direction of propagation of the electromagnetic radiation (1); and
is evaluated with an electronic evaluation unit (5, 7) connected to the spatially resolving detector unit (4), wherein the method has no refractive or transmitting step.

9. A method in accordance with claim 8, wherein at least one wavelength from the wavelength range between far ultraviolet light and infrared light is used as the electromagnetic radiation.

* * * * *